United States Patent [19]
Bechtold et al.

[11] 3,772,878
[45] Nov. 20, 1973

[54] METHOD OF GENERATING POWER

[75] Inventors: Max F. Bechtold, Kennett Square, Pa.; Walter Mahler, Wilmington, Del.

[73] Assignee: E. I. du Pont de Nemours and Company, Wilmington, Del.

[22] Filed: Feb. 29, 1972

[21] Appl. No.: 230,482

[52] U.S. Cl. .................................. 60/36, 252/67
[51] Int. Cl. ............................................ F01k 25/00
[58] Field of Search ........................................ 60/36

[56] References Cited
UNITED STATES PATENTS

| | | | |
|---|---|---|---|
| 3,040,528 | 6/1962 | Tabor et al. ............................ | 60/36 |
| 3,234,734 | 2/1966 | Buss et al. ............................. | 60/36 |
| 3,282,048 | 11/1966 | Murphy et al. ........................ | 60/36 |

*Primary Examiner*—Martin P. Schwadron
*Assistant Examiner*—Allen M. Ostrager
*Attorney*—D. R. J. Boyd

[57] ABSTRACT

The isomers of dibromotrifluorobenzenes have a boiling point of about 205°C and are useful as working fluids in Rankine-cycle engines. 1,3-Dibromo-2,4,5-trifluorobenzene has a melting point of −41°C and is valuable for use in engines which are exposed to cold weather.

4 Claims, No Drawings

METHOD OF GENERATING POWER

FIELD OF THE INVENTION

This invention relates to novel working fluids for use in Rankine-cycle engines.

SUMMARY OF THE INVENTION

The present invention is a method of generating power in which a working fluid is vaporized by heat, the vapor is expanded to do work in a prime mover and after expansion the vapor is condensed to a liquid and recycled, in which the working fluid is at least one isomer of dibromotrifluorobenzene, $C_6HBr_2F_3$, preferably 1,3-dibromo-2,4,5-trifluorobenzene and mixtures thereof with other dibromotrifluorobenzene isomers.

DETAILED DESCRIPTION OF THE INVENTION

Recently there has been considerable interest in external combustion engines, particularly those working on the Rankine cycle for use in relatively low power, portable engines such as car or light boat engines. The fuel requirements for such engines are relatively uncritical. Further, the fuel is burned continously and the heating means can be readily designed to minimize air pollutants in the combustion product.

Water has long been used as the working fluid for Rankine-cycle engines such as reciprocating engines and turbines. Water has the disadvantages of requiring high temperatures and pressures to obtain useful efficiency. Very high velocities are obtained on expansion in simple nozzles so that high speed multiple stage turbines are required to generate power efficiently.

It has been recognized that high density working substances operating at subcritical temperatures and pressures avoid many of the disadvantages of water. Relatively low temperatures and pressures are required, condensation can be effected with relatively small air-cooled condensers, and relatively low efflux velocities are obtained which make feasible the use of single-stage turbine prime movers operating at relatively slow speeds. In addition to possessing suitable thermodynamic properties for use in Rankine-cycle engines, the power fluid must also have sufficient thermal stability. Further it is desirable that the toxicity should be low and that the substance should not support combustion in case of accidental rupture of the closed system containing the working fluid. Again, for use in portable engines such as automobile engines, it is desirable that the fluid does not freeze under winter conditions, i.e., preferably that the freezing point should be below −40°C.

Efficient turbine engines have been designed using a rotary boiler and condenser wherein the power fluid is pumped from the condenser to boiler by centrifugal force as described in the following patents and applications of William A. Doerner: U. S. Pat. Nos. 3,590,786; 3,613,368 and patent application Ser. No. 110,478, filed Jan. 28, 1971. For use in such engines, it is desirable that the fluid have a high density.

It has now been discovered that the isomers of dibromotrifluorobenzene meet the above criteria, except for the very low freezing point. The boiling point of the isomers is about 205°C in each case, and the thermal stability is surprisingly good at 350°C in contact with steel, stainless steel or aluminum. In particular, the 1,3-dibromo-2,4,5-trifluorobenzene has a freezing point of −41°C and is suitable for use in external combustion engines which are exposed to winter conditions.

All of the isomers give thermal efficiencies in the Rankine cycle of about 20 percent at practical temperatures for boiler and condenser.

The 1,3-dibromo-2,4,6-trifluorobenzene isomer has been reported by G. G. Yakobson, N. E. Miranova, A. K. Petrov and N. N. Vorozhtov, Jr., Zhurnal Obshchei Khimii 36, 147 (1966) to have been isolated from the reaction product of $C_6Br_6$ with KF. This isomer is better prepared by the following procedure:

50 g. of 1,3,5-trifluorobenzene are placed in a 250 cc 3-necked flask fitted with a condenser and dropping funnel, and 0.1 g. of iron powder is added as a catalyst. 60 g of bromine is then added dropwise over a 3 hour period from the dropping funnel while stirring the contents of the flask with a magnetic stirring bar. An additional 60 g of bromine is then added over a 4 hour period. The product is 90% 1,3-dibromo-2,4,6-trifluorobenzene, the remainder being isomers of $C_6H_2BrF_3$.

The product is worked with water, dried with $CaSO_4$, and distilled at 25 mm pressure and 101°C to give 60 g of product with normal b.p. 205°C and m.p. +30°C as determined by differential thermal analysis. The identity is confirmed by $^{19}F$ nmr.

The other isomers can be prepared by similar methods as a mixture, which can be separated into the individual components by gas chromatography:

25 g of 1,2,4-trifluorobenzene and 0.1 g of aluminum powder are placed in a 250 cc 3-necked flask fitted with a condenser, a dropping funnel and a magnetic stirring bar. Over a 2 hour period is added 31 g of bromine. Reaction is indicated by the steady elimination of HBr. A further 31 g of bromine is then added followed by 0.1 g of aluminum trichloride, and the reaction mixture is stirred overnight. After 16 hours the product is washed with water, dried over calcium sulfate and distilled under vacuum. A fraction weighing 7 g and boiling at 94°C, 20 mm is found to have the composition $C_6HBr_2F_3$ and to melt between −26°C and −39°C. The mixture is separated into 1,3-dibromo-2,4,5-trifluorobenzene, m.p. +41°C and 1,2-dibromo-3,4,6-trifluorobenzene, m.p. +19°C by gas chromatography.

Since obvious modifications and equivalents in the invention will be evident to those skilled in the arts, we propose to be bound solely by the appended claims.

The embodiments of the invention in which an exclusive property or privilege is claimed are defined as follows:

1. A method of generating power by heating and vaporizing a working substance, expanding the vapor of said working substance in a prime mover to do work, and after doing said work condensing said vapor and recycling wherein said working substance is at least one dibromotrifluorobenzene isomer.

2. Method of claim 1 in which said working substance comprises 1,3-dibromo-2,4,5-trifluorobenzene.

3. The method of claim 1 wherein the working substance is subjected to centrifugal force during the steps of heating and condensing and is recycled by centrifugal force.

4. The method of claim 2 wherein the working substance is subjected to centrifugal force during the steps of heating and condensing and is recycled by centrifugal force.

* * * * *